United States Patent
Smith

(10) Patent No.: US 9,969,920 B2
(45) Date of Patent: May 15, 2018

(54) DRILLING FLUID AND METHOD FOR DRILLING IN COAL-CONTAINING FORMATIONS

(71) Applicant: CANADIAN ENERGY SERVICES L.P., Calgary (CA)

(72) Inventor: Carl Keith Smith, Calgary (CA)

(73) Assignee: CANADIAN ENERGY SERVICES L.P., Calgary (CA)

( * ) Notice: Subject to any disclaimer, the term of this patent is extended or adjusted under 35 U.S.C. 154(b) by 13 days.

(21) Appl. No.: 15/348,629

(22) Filed: Nov. 10, 2016

(65) Prior Publication Data

US 2017/0058178 A1 Mar. 2, 2017

Related U.S. Application Data

(62) Division of application No. 13/817,635, filed as application No. PCT/CA2011/000973 on Aug. 26, 2011, now Pat. No. 9,850,416.

(60) Provisional application No. 61/377,202, filed on Aug. 26, 2010, provisional application No. 61/417,662, filed on Nov. 29, 2010.

(51) Int. Cl.
| | | |
|---|---|---|
| *E21B 21/00* | (2006.01) | |
| *C09K 8/05* | (2006.01) | |
| *C09K 8/16* | (2006.01) | |
| *C09K 8/20* | (2006.01) | |
| *E21B 21/06* | (2006.01) | |

(52) U.S. Cl.
CPC .............. *C09K 8/05* (2013.01); *C09K 8/16* (2013.01); *C09K 8/206* (2013.01); *E21B 21/00* (2013.01); *E21B 21/003* (2013.01); *E21B 21/062* (2013.01)

(58) Field of Classification Search
CPC .................. E21B 21/01; C09K 8/22
See application file for complete search history.

(56) References Cited

U.S. PATENT DOCUMENTS

| | | | |
|---|---|---|---|
| 2,826,548 A | 3/1958 | Busch | |
| 2,873,251 A * | 2/1959 | Jones, Jr. | C09K 8/24 507/113 |
| 3,654,164 A | 4/1972 | Sperry | |
| 3,878,110 A * | 4/1975 | Miller | C09K 8/16 175/65 |
| 4,495,800 A | 1/1985 | Wilcox | |
| 4,664,818 A | 5/1987 | Halliday et al. | |
| 4,664,843 A | 5/1987 | Burba, III et al. | |
| 5,260,269 A | 11/1993 | Hale et al. | |
| 5,337,824 A | 8/1994 | Cowan | |
| 5,363,918 A | 11/1994 | Cowan et al. | |
| 5,439,056 A | 8/1995 | Cowan | |
| 5,821,203 A | 10/1998 | Williamson | |
| 5,975,220 A | 11/1999 | Mueller et al. | |
| 6,025,303 A | 2/2000 | Keilhofer et al. | |
| 6,148,917 A | 11/2000 | Brookey et al. | |
| 7,199,085 B2 | 4/2007 | Rea et al. | |
| 2003/0078306 A1 | 4/2003 | Hoy | |
| 2003/0201103 A1 | 10/2003 | Brookey et al. | |
| 2004/0099446 A1 | 5/2004 | Schlemmer | |
| 2005/0003967 A1 | 1/2005 | Rea et al. | |
| 2005/0022992 A1 | 2/2005 | Di Lullo Arias et al. | |
| 2006/0019834 A1 | 1/2006 | Melbouci et al. | |
| 2007/0135311 A1 | 6/2007 | Van Der Horst | |
| 2007/0197399 A1 | 8/2007 | Sau et al. | |
| 2010/0089650 A1 | 4/2010 | Stoian et al. | |

FOREIGN PATENT DOCUMENTS

| | | |
|---|---|---|
| CA | 2679922 | 9/2008 |
| CN | 1560180 | 1/2006 |
| CN | 1696240 | 12/2006 |
| WO | WO2005095538 | 10/2005 |
| WO | WO2008/106786 | 9/2008 |

OTHER PUBLICATIONS

Drilling Engineering- Azar et al. (2007).*

* cited by examiner

*Primary Examiner* — William D Hutton, Jr.
*Assistant Examiner* — Avi T Skaist
(74) *Attorney, Agent, or Firm* — Bennett Jones LLP

(57) ABSTRACT

A drilling fluid and method for drilling in a coal containing formation with a mixed metal-viscosified drilling fluid including at least 0.05% calcium sulfate.

12 Claims, No Drawings

DRILLING FLUID AND METHOD FOR DRILLING IN COAL-CONTAINING FORMATIONS

CROSS REFERENCE TO RELATED APPLICATIONS

This application is a divisional application of U.S. application Ser. No. 13/817,635 filed May 2, 2013 which is presently pending. U.S. Ser. No. 13/817,635 is a 371 of PCT/CA2011000973 filed Aug. 26, 2011, which claims benefit of U.S. 61/377,202 filed Aug. 26, 2010 and to U.S. 61/417,662 filed Nov. 29, 2010.

FIELD

This invention relates to methods and fluids used for drilling and completing oil wells.

BACKGROUND

The process of drilling a hole in the ground for the extraction of a natural resource requires a fluid for removing the cuttings from the wellbore, lubricating and cooling the drill bit, controlling formation pressures and maintaining hole stability.

Many earth formations contain coal seams through which a wellbore must be drilled to either access the coal itself or reservoirs of interest below the coal.

For coal bed methane (CBM) wells, minimization of formation damage is paramount given the lower permeability of coal seams than conventional reservoirs. A fluid that minimizes formation damage and reduces whole mud loss by limiting the invasion into the cleats and fractures and permits easy flow back has been developed, termed herein as mixed metal-viscosified drilling fluids. Such drilling fluids include a mixed metal viscosifier, which is an inorganic particle based on magnesium/aluminum oxides and/or hydroxides. They are commonly known mixed metal hydroxides and sometimes referred to as mixed metal oxide (MMO), mixed metal hydroxide (MMH) and combinations of mixed metal oxide and hydroxide (MMOH). Mixed metal viscosifier is a mixed metal layered hydroxide compound of the following empirical formula:

$$Li_m D_d T(OH)_{(m+2d+3+na)} A_a^n,$$

Where m represents the number of Li ions present (preferably 0);

D represents divalent metal ions such as Mg, Ca, Ba, Sr, Mn, Fe, Co, Ni, Cu, Zn, most preferably Mg, or mixtures thereof;

d is the number of ions of D in the formula, preferably from 0 to about 4, and most preferably about 1;

T represents trivalent metal ions and may be Al, Ga, Cr or Fe, preferably Al;

A represents monovalent or polyvalent anions other than OH ions and may be inorganic ions such as: halide, sulfate, nitrate, phosphate, carbonate, most preferably halide, sulfate, phosphate, or carbonate, or they may be hydrophilic organic ions such as glycolate, lignosulfate, polycarboxylate, or polyacrylates;

a is the number of ions of A in the formula;

n is the valence of A; and (m+2d+3+na) is equal to or greater than 3.

Particularly preferred is the mixed metal hydroxide of the formula $Al/Mg(OH)_{4.7}Cl_{0.3}$.

Mixed metal-viscosified drilling fluids include an aqueous-based mixture of at least one of the mixed metal moieties and an amount of bentonite. The rheology of mixed metal-viscosified drilling fluids limits fluid invasion into the formation due to high viscosity but the main formation protection comes from the formation of an external filter cake that is easy to remove. Simple displacement to water or brine should be sufficient for the well to flow back and remove the filter cake.

Unfortunately, however, the rheology of mixed metal-viscosified drilling fluids has broken down when coming into contact with coal fines generated from drilling into coal seams, especially young coal. When the drilling fluid comes in contact with coal fines generated by drilling through the seams, the fluid thins, moving toward the rheology of water and therefore loses many of its beneficial properties. Since coal seams are, in fact, often considered loss zone formations, and are weak and friable, the unsuitability of mixed metal-viscosified drilling fluids for drilling in coal containing formations is particularly problematic.

In WO 2008/106786, published Sep. 12, 2008, the present applicant proposed the use of potassium salts including, for example, one or more of potassium sulfate, potassium chloride, potassium acetate and potassium formate to substantially maintain the rheology of mixed metal-viscosified drilling fluids when drilling with coal contaminants.

SUMMARY OF THE INVENTION

In accordance with a broad aspect of the present invention, there is provided a method for drilling in a coal containing formation, the method comprising: providing a mixed metal-viscosified drilling fluid including at least 0.05% (w/v) calcium sulfate; circulating the drilling fluid through the well; and drilling into the coal seam.

In accordance with another broad aspect of the present invention, there is provided a drilling fluid comprising: an aqueous mixture of bentonite and a mixed metal viscosifier with a pH above about pH 10; and at least 0.05% (w/v) calcium sulfate.

It is to be understood that other aspects of the present invention will become readily apparent to those skilled in the art from the following detailed description, wherein various embodiments of the invention are shown and described by way of example. As will be realized, the invention is capable for other and different embodiments and its several details are capable of modification in various other respects, all without departing from the spirit and scope of the present invention. Accordingly the detailed description and examples are to be regarded as illustrative in nature and not as restrictive.

DESCRIPTION OF VARIOUS EMBODIMENTS

The detailed description and examples set forth below are intended as a description of various embodiments of the present invention and are not intended to represent the only embodiments contemplated by the inventor. The detailed description includes specific details for the purpose of providing a comprehensive understanding of the present invention. However, it will be apparent to those skilled in the art that the present invention may be practiced without these specific details.

Until now mixed metal-viscosified drilling fluids have been used generally unsuccessfully in coal seams due to the fluid thinning effect from the coal. It is believed that the polyanionic nature of coal fines, such as of lignite and lignosulfonates, interfere with the electrostatic interactions of the mixed metal moiety and the bentonite in the drilling fluid, sometimes resulting in a complete collapse of the fluid's rheology.

We have determined that some salts reduce or prevent the thinning effect from drilling coals with mixed metal-viscosified fluids. We previously proposed the use of potassium salts including, for example, one or more of potassium sulfate, potassium chloride, potassium acetate and potassium formate to substantially maintain the rheology of mixed metal-viscosified drilling fluids when drilling with coal contaminants. We have now found that calcium sulfate, such as, for example, in the form of gypsum, may also substantially maintain the rheology of mixed metal-viscosified drilling fluids when drilling with coal contaminants. Calcium sulfate prevents the thinning effect of drilling coals with mixed metal-viscosified fluids, such as those based on MMH, MMO or MMOH. Such a salt may also add a benefit of shale swelling inhibition, possibly as a result of the presence of the calcium ion from the salt.

The amount of salt added to the drilling fluid may be determined by the amount of coal to be drilled and/or by the shale reactivity. For example, younger coals, more so than older coals, tend to create greater rheological instability for mixed metal-viscosified drilling fluids and, thus, higher concentrations of the salts may be useful in the drilling fluid. Also, if it is determined that there are significant coal deposits through which the well must be drilled, again higher concentrations of the salts may be useful.

For calcium sulfate, concentrations greater than 0.05% (weight by volume), may be effective in the mixed metal-viscosified drilling fluid. While amounts of up to 5% or more may be used, generally concentrations of 0.05%-1.0% (weight by volume) calcium sulfate and, for example, 0.05-0.5% salt (weight by volume) or 0.1-0.5% concentrations have been found to be both effective for stabilizing the drilling fluid against adverse rheological changes due to coal contamination and advantageous in terms of economics. In younger coals or where significant coal deposits must be drilled, higher concentrations (for example greater than 0.3% and for example 0.3-1.0%) of calcium sulfate in the drilling fluid may be useful. It is believed that the calcium sulfate reaches saturation at about 2 to 3 kg/m3, (0.2 to 0.3% (w/v)), but excess amounts may be added without an adverse effect and in fact may create a buffer of salt to maintain activity, provided the fluid remains a liquid which can be circulated through the wellbore. Generally, based on a cost/benefit analysis, an upper limit of 1.0% or more likely 0.5% is considered sound.

If desired, potassium salt may also be added to the drilling fluid. A wide range of potassium salt concentrations, such as concentrations greater than 1% (weight by volume), may be effective in the mixed metal-viscosified drilling fluid. Generally concentrations of 1-10% (weight by volume) salt and, for example, 1-5% salt (weight by volume) concentrations have been found to be both effective for stabilizing the drilling fluid against adverse rheological changes due to coal contamination and advantageous in terms of economics. In younger coals or where significant coal deposits must be drilled, higher concentrations (for example greater than 3% and for example 3-10%) of potassium salts in the drilling fluid may be useful.

Although the salt may be added after the coal contamination occurs, it is recommended to pre-treat the system for best results. In one embodiment, for example, the surface hole can be drilled down to approximately the level of the first coal deposit using any drilling fluid of interest, including for example, prior art mixed metal-viscosified drilling fluids. When it is determined that the coal seam is close below bottom hole or when the coal seam has been reached, the drilling fluid may be changed over to a drilling fluid according to the present invention, including a mixed metal-viscosified drilling fluid containing an amount of a calcium sulfate. When considering surface drilling and possible contact with aquifers and surface water, calcium sulfate may be particularly of interest.

Alternately, the borehole may be drilled down to and through a coal seam using a drilling fluid according to the present invention. For example, the entire well substantially from surface, which it will be appreciated may include drilling from surface or from below the overburden or after the casing point, may be drilled using a drilling fluid according to the present invention. For example, the use of the current drilling fluid may be initiated upon initiation of the drilling operation.

After drilling through the coal seams in the path of the borehole, the present drilling fluid may continue to be used for the remainder of the wellbore or other drilling fluids may be used. However, if coal fines may continue to become entrained in the drilling fluid, for example where a coal seam remains open to contact by the drilling fluid, it may be useful to continue using the present drilling fluid until drilling is complete or the possibility of coal contamination is eliminated. If desired, the drilling fluid returning to the mud tanks at surface may be monitored to determine the concentration of potassium salt and/or calcium sulfate therein, as well as other parameters, to ensure that appropriate levels and fluid characteristics are maintained. For example, any one or more of the bentonite, mixed metal viscosifier, base, or the salt being employed (the potassium salt and/or calcium sulfate) may be added during drilling to adjust the drilling fluid parameters. In one embodiment, for example, an amount of mixed metal viscosifier may be added to the fluid during the course of a drilling operation where reactive formations are drilled and drill cuttings become incorporated to change the rheology of the drilling fluid. In such a case, the addition of an amount of mixed metal viscosifier can cause the viscosity of the fluid to increase.

As will be appreciated, the drilling fluid may be circulated through the drill string, drill bit and well bore annulus while drilling. Circulation of the drilling fluid may continue even when drilling is stopped in order to condition the well, prevent string sticking, etc.

During the drilling and circulation, the yield point of the drilling fluid may be maintained above 10 Pa to provide advantageous effects.

Mixed metal-viscosified drilling fluids include bentonite and a mixed metal viscosifier in water and are pH controlled.

Bentonite is commonly used in drilling fluids and its use will be well understood by those skilled in the art. While various forms of bentonite may be used, bentonites that contain polyanionic additives or impurities should be avoided, with consideration as to the electrostatic interaction of the bentonite and mixed metal viscosifier. An untreated bentonite may be particularly useful. Such an untreated bentonite may alternately be known commercially as un-peptized or natural bentonite and has a high content of sodium montmorillonite or Wyoming bentonite. Herein, the general term bentonite includes at least all of these forms.

As noted above, a mixed metal viscosifier is an inorganic particle based on magnesium/aluminum oxides and/or hydroxides. While sometimes referred to as mixed metal oxide (MMO), mixed metal hydroxide (MMH) and combinations of mixed metal oxide and hydroxide (MMOH), mixed metal viscosifiers are commonly known as mixed metal hydroxides and are understood to be represented by the formula:

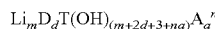
$$Li_m D_d T(OH)_{(m+2d+3+na)} A_a^n$$

where
- m represents the number of Li ions present including 0;
- D represents divalent metal ions such as Mg, Ca, Ba, Sr, Mn, Fe, Co, Ni, Cu and Zn;
- d is a number from 1 to about 4;
- T is a trivalent metal;
- A is a mono or polyvalent anion other than OH;
- a represents the number of ions of A ions present;
- n is the valence of A; and
- (m+2d+3+na) is equal to or greater than 3.

In one embodiment, the mixed metal hydroxide has the formula:

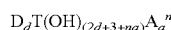
$$D_d T(OH)_{(2d+3+na)} A_a^n$$

where
- D represents divalent metal ions such as Mg, Ca, Ba, Sr, Mn, Fe, Co, Ni, Cu and Zn;
- d is a number from 1 to about 4;
- T is a trivalent metal;
- A is a mono or polyvalent anion other than OH;
- a represents the number of ions of A ions present;
- n is the valence of A; and
- (2d+3+na) is equal to or greater than 3.

For example, the divalent metal may be Mg and the trivalent metal may be Al. In one embodiment, the mixed metal viscosifier of greatest interest is a mixed metal hydroxide having the formula $MgAl(OH)_{4.7}Cl_{0.3}$.

Mixed metal viscosifiers are commercially available such as from BASF Oilfield Polymers Inc. under the trademark Polyvis II™.

Generally, mixed metal-viscosified drilling fluids may include low concentrations of bentonite (for example, about 15 to 50 kg/m3 or 25 to 45 kg/m3 bentonite in water). Considering that many bentonite based (non-mixed metal) drilling fluids can contain many multiples more (i.e. two to four times) bentonite than in a mixed metal-viscosified drilling fluid, it can be appreciated that the viscosity generated using such low concentrations of bentonite for mixed metal-viscosified drilling fluids might be insufficient for hole cleaning. The addition of mixed metal oxide, mixed metal hydroxide or mixed metal oxide and hydroxide, including activated forms thereof, at a weight ratio of 1:8 to 1:12 or 1:9.5 to 1:10.5 to the bentonite produces a stable fluid when the pH is initially maintained above about 10.0 and possibly between about 10.5 and 13, as may be achieved by addition of caustic soda and/or caustic potash. While other bases may be used to adjust the pH, care may be taken to avoid precipitation with calcium sulfate. Once the bentonite/mixed metal viscosifier reaction is complete and a gel is formed, it appears that the pH can be lowered to pH 9 or possibly even lower without any significant loss in viscosity.

In one embodiment, a mixed metal-viscosified drilling fluid may include an aqueous mixture of 25 to 45 kg/m3 bentonite, a mixed metal moiety in a weight ratio of about 1:10 MMO, MMH or MMOH to bentonite, pH controlled to greater than pH 11 and 0.05 to 1.0% calcium sulfate.

If desired, an amount of potassium salt may be added.

Additives for fluid loss control, lost circulation, etc. may be added to the drilling fluid mixture, as desired. Non or minor-ionic additives may be most useful. Some examples may include starch for fluid loss reduction, organophillic lost circulation materials (LCM), etc. Simple testing may verify the compatibility of any particular additive with the drilling fluid.

To produce the drilling fluid, the bentonite may first be hydrated in water. Then the mixed metal moiety is added and pH is adjusted. The salt can be added to the aqueous mixture of bentonite and mixed metal any time before it is needed for drilling with coal contamination. Additives such as LCM, fluid loss control agents, etc. can also be added when appropriate, as will be appreciated.

A typical drilling fluid formulation may be according to Table 1A.

TABLE 1A

A typical drilling fluid useful for drilling in coal-containing formations

| Product | Concentration | Notes |
|---|---|---|
| Untreated bentonite | 30 kg/m3 | Prehydrate first in fresh water |
| MMH or MMO or MMOH | 3 kg/m3 | |
| Caustic Soda | 0.5 to 1 kg/m3 | To control pH at 11-12.5 |
| Potassium Sulfate | 20 to 50 kg/m3 | |
| Starch | 5 to 10 kg/m3 | |

Another typical drilling fluid formulation may be according to Table 1B.

TABLE 1B

A typical drilling fluid useful for drilling in coal-containing formations

| Product | Concentration | Notes |
|---|---|---|
| Untreated bentonite | 25 to 45 kg/m3 | Prehydrate first in fresh water |
| MMH or MMO or MMOH | 2.5 to 4.5 kg/m3 | |
| Caustic Soda | 0.5 to 1 kg/m3 | To control pH at 11-12.5 |
| Calcium Sulfate | 0.5 to 50 kg/m3 | |
| Starch | 5 to 10 kg/m3 | |

The following examples are included for the purposes of illustration only, and are not intended to limit the scope of the invention or claims.

EXAMPLES

Example I

In the following examples, drilling fluids were prepared according to the sample descriptions by hydrating the bentonite, adding the mixed metal moiety and adjusting the pH, as needed. Thereafter, gypsum and lignite (to simulate coal contamination) were added in various orders of addition to measure the effects of both agents on their own and in combination on fluid rheology.

The rheological properties have been tested using a Fann™ 35 and Brookfield™ viscometers. As will be appreciated, in the following examples: RPM means revolutions per minute, PV means plastic viscosity, YP means yield point, LSRV means low-shear-rate viscosity and MBT means methylene blue test Federal Supreme™ is used as the bentonite (untreated). Federal Supreme is a natural untreated bentonite (sodium montmorillonite). The MMH used is Polyvis II™ from BASF.

Below is a set of experiments with a basic 40 kg/m3 natural bentonite (untreated sodium montmorillonite) slurry that was pre-hydrated for 16 hours in fresh water followed by additions of Mixed metal hydroxide (MMH; BASF Polyvis II) and then caustic to raise the pH to 11.0 or above. The slurry quickly becomes viscous with the addition of the caustic. The rheology is measured with a Fann 35 rotary viscometer. The effect of the addition of small amounts (5 g/L) of lignite to this thick slurry is measured. In the case of a control, the fluid changes from very viscous to very thin (almost the consistency of water) after the addition of lignite. This is now compared to a slurry that has been pre-treated with 5 g/L of gypsum prior to the addition of lignite to the test slurry. It can be seen that the thinning effect of lignite is completely avoided.

TABLE 2

Composition of Sample #1

| Products | Sample #1 |
|---|---|
| Untreated Bentonite | 40 kg/m3 |
| MMH | 4 kg/m3 |
| Caustic | 0.5 kg/m3 |

TABLE 3

Results without and with the addition of Gypsum

| Mud Properties | Sample #1 | Sample #1 + 5 kg/m3 Lignite | Sample #1 + 5 kg/m3 Gypsum + 5 kg/m3 Lignite |
|---|---|---|---|
| 600 RPM | 134 | 21 | 153 |
| 300 RPM | 128 | 12 | 134 |
| 200 RPM | 121 | 9 | 129 |
| 100 RPM | 112 | 6 | 115 |
| 6 RPM | 71 | 1 | 68 |
| 3 RPM | 69 | 1 | 65 |
| PV (mPa * s) | 6 | 9 | 19 |
| YP (Pa) | 61 | 1.5 | 57.5 |
| pH | 10.7 | 10.7 | 10.5 |

The above experiment is repeated but with a slurry containing less MMH and Natural bentonite (30 kg/m3). Additional caustic is added along with the gypsum to maintain a constant pH in the slurry.

TABLE 4

Composition of Sample #2

| Products | Sample #2 |
|---|---|
| Untreated Bentonite | 30 kg/m3 |
| MMH | 3 kg/m3 |
| Caustic | 0.5 kg/m3 |

TABLE 5

Results without and then with the addition of Gypsum

| Mud Properties | Sample #2 | Sample #2 + 5 kg/m3 Gypsum + 0.2 kg/m3 Caustic | Sample #2 + 5 kg/m3 Gypsum + 0.2 kg/m3 Caustic + 5 kg/m3 Lignite |
|---|---|---|---|
| 600 RPM | 100 | 113 | 82 |
| 300 RPM | 88 | 100 | 73 |
| 200 RPM | 81 | 90 | 67 |
| 100 RPM | 70 | 76 | 58 |
| 6 RPM | 42 | 44 | 34 |
| 3 RPM | 41 | 35 | 29 |
| PV (mPa * s) | 12 | 13 | 9 |
| YP (Pa) | 38 | 43.5 | 32 |
| pH | 11 | 11 | 11 |

In another test a MMH-bentonite (30 kg/m3) slurry is examined; first 5 kg/m3 lignite is added to the basic slurry and then gypsum is added after the lignite:

The MMH-bentonite slurry is mixed by the same method as the experiment above; that is first the untreated bentonite is mixed and hydrated in fresh water for at least 16 hours. Then the MMH is mixed in followed by the addition of the caustic to raise the pH to 11.0 or above to initiate the viscosifying process.

The rheology is measured using a Fann 35 rotary viscometer and recorded. Then 5 g/l of lignite is added and the rheology is measured and compared again. Finally 5 g/l gypsum is added to the thin mixture containing lignite and allowed to mix for 30 minutes followed by caustic to raise the pH again to 11; when the rheology is measured again.

TABLE 6

Results without and then with the addition of Gypsum

| Mud Properties | Sample #2 | Sample #2 + 5 kg/m3 Lignite | Sample #2 + 5 kg/m3 Lignite then + 5 kg/m3 Gypsum + Caustic |
|---|---|---|---|
| 600 RPM | 100 | 8 | 52 |
| 300 RPM | 90 | 4 | 46 |
| 200 RPM | 75 | 3 | 42 |
| 100 RPM | 67 | 2 | 37 |
| 6 RPM | 22 | 0 | 23 |
| 3 RPM | 19 | 0 | 20 |
| PV (mPa * s) | 10 | 4 | 6 |
| YP (Pa) | 40 | 0 | 20 |
| pH | 11.5 | 10.5 | 11 |

This experiment shows that the adverse thinning effect of lignite on these slurries can be at least partially reversed with the addition of gypsum.

Example II

In the following examples, drilling fluids were prepared according to the sample descriptions by hydrating the bentonite, adding the mixed metal moiety and adjusting the pH, as needed. Thereafter, any additives, including potassium salt if any, were added.

TABLE 7

Composition of Sample #3

| Products | Sample #3 |
|---|---|
| Untreated Bentonite | 30 kg/m3 |
| MMH | 3 kg/m3 |

TABLE 7-continued

Composition of Sample #3

| Products | Sample #3 |
|---|---|
| Caustic | 0.5 kg/m3 |
| Starch | 10 kg/m3 |

TABLE 8

Results without the addition of Salt

| Mud Properties | Sample #3 | Sample #3 + 5 kg/m3 Lignite | Sample #3 + 15 kg/m3 Lignite |
|---|---|---|---|
| 600 RPM | 86 | 47 | 43 |
| 300 RPM | 64 | 29 | 25 |
| 200 RPM | 53 | 21 | 18 |
| 100 RPM | 40 | 13 | 10 |
| 6 RPM | 19 | 2 | 1.5 |
| 3 RPM | 17 | 1 | 1 |
| 10 sec Gel (Pa) | 8 | 1 | 0.5 |
| PV (mPa * s) | 22 | 18 | 18 |
| YP (Pa) | 21 | 5.5 | 3.5 |
| LSRV (cP) | 54,000 | 12,000 | 0 |
| Temperature (° C.) | 22.8 | 22.3 | 23.0 |

TABLE 9

Results using Potassium Chloride

| Mud Properties | Sample #3 + 2% KCl | Sample #3 + 2% KCl + 5 kg/m3 Lignite | Sample #3 + 2% KCl + 15 kg/m3 Lignite |
|---|---|---|---|
| 600 RPM | 66 | 47 | 44 |
| 300 RPM | 52 | 31 | 27 |
| 200 RPM | 46 | 23 | 21 |
| 100 RPM | 38 | 16 | 14 |
| 6 RPM | 18 | 4 | 3 |
| 3 RPM | 16 | 3 | 2 |
| 10 sec Gel (Pa) | 7 | 2 | 1.5 |
| PV (mPa * s) | 14 | 16 | 17 |
| YP (Pa) | 19 | 7.5 | 5 |
| LSRV (cP) | 25,000 | 12,000 | 9,000 |
| Temperature (° C.) | 21.6 | 22.1 | 22.3 |

TABLE 10

Results using Potassium Acetate

| Mud Properties | Sample #3 + 2% Pot. Acetate | Sample #3 + 2% Pot. Acetate + 5 kg/m3 Lignite | Sample #3 + 2% Pot. Acetate + 15 kg/m3 Lignite |
|---|---|---|---|
| 600 RPM | 66 | 52 | 48 |
| 300 RPM | 47 | 38 | 35 |
| 200 RPM | 39 | 32 | 29 |
| 100 RPM | 30 | 25 | 22 |
| 6 RPM | 12 | 10 | 10 |
| 3 RPM | 8 | 8 | 7 |
| 10 sec Gel (Pa) | 4 | 4 | 4 |
| PV (mPa * s) | 13 | 14 | 13 |
| YP (Pa) | 20 | 12 | 11 |
| LSRV (cP) | 31,000 | 20,000 | 12,000 |
| Temperature (° C.) | 23.2 | 23.3 | 23.2 |

Note:
Lignite dissolves slower.

TABLE 11

Results using Potassium Formate

| Mud Properties | Sample #3 + 2% Pot. Formate | Sample #3 + 2% Pot. Formate + 5 kg/m3 Lignite | Sample #3 + 2% Pot. Formate + 15 kg/m3 Lignite |
|---|---|---|---|
| 600 RPM | 66 | 47 | 42 |
| 300 RPM | 53 | 32 | 28 |
| 200 RPM | 47 | 26 | 22 |
| 100 RPM | 38 | 18 | 16 |
| 6 RPM | 19 | 6 | 5 |
| 3 RPM | 18 | 4 | 4 |
| 10 sec Gel (Pa) | 7 | 2 | 2 |
| PV (mPa * s) | 13 | 15 | 14 |
| YP (Pa) | 20 | 8.5 | 7 |
| LSRV (cP) | 21,000 | 13,000 | 12,000 |
| Temperature (° C.) | 22.1 | 22.3 | 22.6 |

TABLE 12

Results using Calcium Nitrate

| Mud Properties | Sample #3 + 2% Calcium Nitrate | Sample #3 + 2% Calcium Nitrate + 5 kg/m3 Lignite | Sample #3 + 2% Calcium Nitrate + 15 kg/m3 Lignite |
|---|---|---|---|
| 600 RPM | 60 | 57 | 47 |
| 300 RPM | 46 | 42 | 34 |
| 200 RPM | 38 | 34 | 28 |
| 100 RPM | 31 | 27 | 22 |
| 6 RPM | 12 | 11 | 7 |
| 3 RPM | 9 | 9 | 5 |
| 10 sec Gel (Pa) | 5 | 5 | 3 |
| PV (mPa * s) | 14 | 15 | 13 |
| YP (Pa) | 16 | 13.5 | 10.5 |
| LSRV (cP) | 33,000 | 23,000 | 22,000 |
| Temperature (° C.) | 21.5 | 22.1 | 22.7 |

Note:
Lignite dissolves slower.

TABLE 13

Results using Calcium Chloride

| Mud Properties | Sample #3 + 2% Calcium Chloride | Sample #3 + 2% Calcium Chloride + 5 kg/m3 Lignite | Sample #3 + 2% Calcium Chloride + 15 kg/m3 Lignite |
|---|---|---|---|
| 600 RPM | 61 | 51 | 47 |
| 300 RPM | 44 | 35 | 34 |
| 200 RPM | 36 | 30 | 29 |
| 100 RPM | 27 | 22 | 23 |
| 6 RPM | 10 | 8 | 8 |
| 3 RPM | 8 | 7 | 6 |
| 10 sec Gel (Pa) | 3.5 | 3.5 | 3 |
| PV (mPa * s) | 17 | 16 | 13 |
| YP (Pa) | 13.5 | 9.5 | 10.5 |
| LSRV (cP) | 27,000 | 23,000 | 22,000 |
| Temperature (° C.) | 24.4 | 24.4 | 24.2 |

Note:
Lignite dissolves slower.

TABLE 14

Results using Potassium Sulfate

| Mud Properties | Sample #3 + 2% Pot. Sulfate | Sample #3 + 2% Pot. Sulfate + 5 kg/m3 Lignite | Sample #3 + 2% Pot. Sulfate + 15 kg/m3 Lignite |
| --- | --- | --- | --- |
| 600 RPM | 75 | 42 | 34 |
| 300 RPM | 60 | 29 | 21 |
| 200 RPM | 52 | 24 | 16 |
| 100 RPM | 41 | 18 | 11 |
| 6 RPM | 21 | 8 | 2.5 |
| 3 RPM | 19 | 7 | 2 |
| 10 sec Gel (Pa) | 9 | 4 | 2.5 |
| PV (mPa * s) | 15 | 13 | 13 |
| YP (Pa) | 22.5 | 8 | 4 |
| LSRV (cP) | 32,000 | 30,000 | 25,000 |
| Temperature (° C.) | 24.4 | 24.0 | 21.3 |

TABLE 15

Results using Potassium Chloride

| Mud Properties | Sample #1 + 5% KCl | Sample #1 + 5% KCl + 5 kg/m3 Lignite | Sample #1 + 5% KCl + 15 kg/m3 Lignite |
| --- | --- | --- | --- |
| 600 RPM | 61 | 52 | 46 |
| 300 RPM | 49 | 39 | 35 |
| 200 RPM | 45 | 35 | 32 |
| 100 RPM | 42 | 32 | 30 |
| 6 RPM | 16 | 15 | 15 |
| 3 RPM | 12 | 11 | 10 |
| 10 sec Gel (Pa) | 6 | 6 | 5 |
| PV (mPa * s) | 12 | 13 | 11 |
| YP (Pa) | 18.5 | 13 | 12 |
| LSRV (cP) | 30,000 | 18,000 | 21,000 |
| Temperature (° C.) | 20.1 | 20.1 | 20.1 |

TABLE 16

Results using Potassium Acetate

| Mud Properties | Sample #3 + 5% Pot. Acetate | Sample #3 + 5% Pot. Acetate + 5 kg/m3 Lignite | Sample #3 + 5% Pot. Acetate + 15 kg/m3 Lignite |
| --- | --- | --- | --- |
| 600 RPM | 63 | 48 | 44 |
| 300 RPM | 55 | 37 | 36 |
| 200 RPM | 51 | 36 | 34 |
| 100 RPM | 47 | 34 | 32 |
| 6 RPM | 14 | 20 | 16 |
| 3 RPM | 9 | 11 | 11 |
| 10 sec Gel (Pa) | 5 | 5 | 6 |
| PV (mPa * s) | 8 | 11 | 8 |
| YP (Pa) | 23.5 | 13 | 14 |
| LSRV (cP) | 27,000 | 14,000 | 33,000 |
| Temperature (° C.) | 20.1 | 20.1 | 20.1 |

Note:
Lignite dissolves slower.

TABLE 17

Results using Potassium Formate

| Mud Properties | Sample #1 + 5% Pot. Formate | Sample #1 + 5% Pot. Formate + 5 kg/m3 Lignite | Sample #1 + 5% Pot. Formate + 15 kg/m3 Lignite |
| --- | --- | --- | --- |
| 600 RPM | 50 | 46 | 42 |
| 300 RPM | 40 | 33 | 33 |
| 200 RPM | 37 | 30 | 30 |
| 100 RPM | 32 | 28 | 29 |
| 6 RPM | 9 | 9 | 14 |
| 3 RPM | 5 | 8 | 10 |
| 10 sec Gel (Pa) | 3 | 4 | 5 |
| PV (mPa * s) | 10 | 13 | 9 |
| YP (Pa) | 15 | 10 | 12 |
| LSRV (cP) | 30,000 | 29,000 | 31,000 |
| Temperature (° C.) | 20.1 | 20.1 | 20.1 |

TABLE 18

Results using Calcium Nitrate

| Mud Properties | Sample #3 + 5% Calcium Nitrate | Sample #3 + 5% Calcium Nitrate + 5 kg/m3 Lignite | Sample #3 + 5% Calcium Nitrate + 15 kg/m3 Lignite |
| --- | --- | --- | --- |
| 600 RPM | 58 | 49 | 44 |
| 300 RPM | 52 | 42 | 38 |
| 200 RPM | 50 | 41 | 37 |
| 100 RPM | 47 | 35 | 32 |
| 6 RPM | 12 | 11 | 14 |
| 3 RPM | 8 | 8 | 8 |
| 10 sec Gel (Pa) | 5 | 4.5 | 4.5 |
| PV (mPa * s) | 6 | 7 | 6 |
| YP (Pa) | 23 | 17.5 | 16 |
| LSRV (cP) | 35,000 | 43,000 | 23,000 |
| Temperature (° C.) | 20.1 | 20.1 | 20.1 |

Note:
Lignite dissolves slower.

TABLE 19

Results using Calcium Chloride

| Mud Properties | Sample #3 + 5% Calcium Chloride | Sample #3 + 5% Calcium Chloride + 5 kg/m3 Lignite | Sample #3 + 5% Calcium Chloride + 15 kg/m3 Lignite |
| --- | --- | --- | --- |
| 600 RPM | 63 | 48 | 43 |
| 300 RPM | 50 | 37 | 34 |
| 200 RPM | 42 | 34 | 31 |
| 100 RPM | 35 | 29 | 29 |
| 6 RPM | 13 | 12 | 13 |
| 3 RPM | 10 | 9 | 11 |
| 10 sec Gel (Pa) | 6.5 | 6.5 | 7 |
| PV (mPa * s) | 13 | 11 | 9 |
| YP (Pa) | 18.5 | 13 | 11.5 |
| LSRV (cP) | 40,000 | 37,000 | 27,000 |
| Temperature (° C.) | 20.1 | 20.1 | 20.1 |

Note:
Lignite dissolves slower.

TABLE 20

Results using Potassium Sulfate

| Mud Properties | Sample #3 + 5% Pot. Sulfate | Sample #3 + 5% Pot. Sulfate + 5 kg/m3 Lignite | Sample #3 + 5% Pot. Sulfate + 15 kg/m3 Lignite |
|---|---|---|---|
| 600 RPM | 165 | 128 | 91 |
| 300 RPM | 150 | 115 | 76 |
| 200 RPM | 143 | 109 | 71 |
| 100 RPM | 131 | 100 | 63 |
| 6 RPM | 85 | 67 | 42 |
| 3 RPM | 37 | 58 | 39 |
| 10 sec Gel (Pa) | 16 | 29 | 22 |
| PV (mPa * s) | 15 | 13 | 15 |
| YP (Pa) | 77.5 | 51 | 30.5 |
| LSRV (cP) | 100,000+ | 80,000 | 67,000 |
| Temperature (° C.) | 20.1 | 20.1 | 20.1 |

TABLE 21

Results using Sodium Sulfate

| Mud Properties | Sample #3 + 2% Sodium Sulfate | Sample #3 + 2% Sodium Sulfate + 5 kg/m3 Lignite | Sample #3 + 2% Sodium Sulfate + 15 kg/m3 Lignite |
|---|---|---|---|
| 600 RPM | 179 | 39 | 31 |
| 300 RPM | 155 | 25 | 19 |
| 200 RPM | 143 | 20 | 15 |
| 100 RPM | 123 | 14 | 9 |
| 6 RPM | 72 | 8 | 3 |
| 3 RPM | 63 | 7 | 2 |
| 10 sec Gel (Pa) | 31 | 5 | 2.5 |
| PV (mPa * s) | 24 | 14 | 13 |
| YP (Pa) | 65.5 | 5.5 | 4 |
| LSRV (cP) | 90,000 | 50,000 | 28,000 |
| Temperature (° C.) | 22.0 | 22.0 | 22.0 |

TABLE 22

Results using Sodium Sulfate

| Mud Properties | Sample #3 + 5% Sodium Sulfate | Sample #3 + 5% Sodium Sulfate + 5 kg/m3 Lignite | Sample #3 + 5% Sodium Sulfate + 15 kg/m3 Lignite |
|---|---|---|---|
| 600 RPM | 207 | 48 | 33 |
| 300 RPM | 174 | 38 | 22 |
| 200 RPM | 152 | 35 | 18 |
| 100 RPM | 124 | 31 | 13 |
| 6 RPM | 74 | 27 | 11 |
| 3 RPM | 67 | 26 | 10 |
| 10 sec Gel (Pa) | 28 | 14 | 9 |
| PV (mPa * s) | 33 | 10 | 11 |
| YP (Pa) | 70.5 | 14 | 5.5 |
| LSRV (cP) | 100,000 | 100,000 | 80,000 |
| Temperature (° C.) | 22.0 | 22.0 | 22.0 |

Example III

Background: Nr Wetaskiwin, Alberta, Drilled 222 mm hole to Intermediate Casing Depth of 1425 mMD and set casing at ~86.2 degrees inclination in the Rex Coal formation. Set and cement 177.8 mm casing.

Drilling Fluid: 60m3 of mud is premixed with the following formulation: 30 kg/m3 of natural bentonite is prehydrated in fresh water for 16 hours. 3 kg/m3 of PolyVis II (MMH) is added over 2 hours. pH is raised to 12.0 with caustic via chemical barrel over pre-mix tank. Fluid becomes viscous. 50 kg/m3 of potassium sulfate is added.

Drilling in Coal: Intermediate casing shoe and cement are drilled out with a 156 mm bit using water and then water is displaced over to the pre-mixed system, described above. This well was drilled horizontally in the Rex Coal formation using the pre-mixed system.

Fluid Properties Prior to Drilling Coal:
Premix: 60 m3 circulating system.
Depth: 1425 m (87.2 degrees inclination)
Funnel Viscosity: 55 s/L
Mud density: 1050 kg/m3
pH: 12.0
600 reading: 64
300 reading: 61
200 reading: 60
100 reading: 56
6 reading: 36
3 reading: 23
PV (mPa·s): 3
YP (Pa): 29
Gels (Pa): 11/11
Filtrate (Fluid Loss, mls/30 min): no control
MBT: 30 Kg/m3
Potassium ion (mg/L): 25,000

Fluid Properties after Drilling to 1451 m in Rex Coal Formation:
Depth: 1451 m (88 degrees inclination)
Funnel Viscosity: 66 s/L
Mud density: 1060 kg/m3
pH: 11.5
600 reading: 62
300 reading: 55
200 reading: —
100 reading: —
6 reading: —
3 reading: —
PV (mPa·s): 7
YP (Pa): 24
Gels (Pa): 6/10
Filtrate (Fluid Loss, mls/30 min): 60
MBT: 24 Kg/m3
Potassium ion (mg/L): 22,000

It was determined that the fluid viscosity remained substantially stable despite drilling pure coal.

Thereafter drilling continued to 1845 m in Rex Coal formation with the addition of 15×22.7 kg sacks of non-ionic starch (Unitrol Starch) for fluid loss control into 80m3 system:

Fluid Properties at Depth 1845 m (91.4 Degrees Inclination):
Funnel Viscosity: 59 s/L
Mud density: 1050 kg/m3
pH: 12.0
600 reading: 64
300 reading: 56
200 reading: —
100 reading: —
6 reading: —
3 reading: —
PV (mPa·s): 8
YP (Pa): 24
Gels (Pa): 9/11
Filtrate (Fluid Loss, mls/30 min): 19
MBT: 22 Kg/m3
Potassium ion (mg/L): 20,400

The addition of starch doesn't affect the rheology substantially.

After Drilling to 2050 m in the Rex Coal Formation the Fluid Properties were as Follows (89m3 System):
Depth: 2050 m (87.8 degrees inclination)
Funnel Viscosity: 85 s/L
Mud density: 1050 kg/m3
pH: 12.0
600 reading: 80
300 reading: 70
200 reading: 65
100 reading: 60
6 reading: 47
3 reading: 44
PV (mPa·s): 10
YP (Pa): 30
Gels (Pa): 17/18
Filtrate (Fluid Loss, mls/30 min): 15
MBT: 25 Kg/m3
Potassium ion (mg/L): 22,500

It was determined that a mixed metal viscosified—natural bentonite type rheology can be maintained when drilling through coal with potassium sulfate as an additive.

Example IV

TABLE 23

Composition of Sample #4

| Products | Sample #4 |
|---|---|
| Untreated bentonite | 30 kg/m3 |
| MMH | 3 kg/m3 |

In the following examples, drilling fluids were prepared according to the sample descriptions and in a similar manner to Example I but with less calcium sulfate (gypsum). Sample #4 is prepared as follows: The bentonite (Federal Supreme) is prehydrated 3 hours and then MMH (Polyvis II) is added.

Caustic soda (NaOH) is added to adjust pH, followed by gypsum and then lignite to simulate the addition of coal.

TABLE 24

Results using calcium sulfate in bentonite - MMH solution

| Mud Property | Sample #4 | Sample #4 + Caustic | Sample #4 + Caustic + 2 kg/m3 Gyp | Sample #4 + Caustic + 2 kg/m3 Gyp + 5 kg/m3 Lignite |
|---|---|---|---|---|
| 600 RPM | 91 | 95 | 98 | 93 |
| 300 RPM | 80 | 80 | 91 | 85 |
| 200 RPM | 74 | 76 | 89 | 78 |
| 100 RPM | 66 | 69 | 81 | 74 |
| 6 RPM | 42 | 22 | 24 | 25 |
| 3 RPM | 22 | 17 | 18 | 18 |
| PV (mPa * s) | 11 | 15 | 7 | 8 |
| YP (Pa) | 34.5 | 32.5 | 42 | 38.5 |
| pH | 9.2 | 10.7 | 10.7 | 10.0 |

| Mud Property | Sample #3 + Caustic + 5 kg/m3 Gyp | Sample #3 + Caustic + 5 kg/m3 Gyp + 5 kg/m3 Lignite |
|---|---|---|
| 600 RPM | 82 | 71 |
| 300 RPM | 72 | 66 |
| 200 RPM | 68 | 60 |

TABLE 24-continued

Results using calcium sulfate in bentonite - MMH solution

| 100 RPM | 60 | 53 |
|---|---|---|
| 6 RPM | 17 | 17 |
| 3 RPM | 14 | 12 |
| PV (mPa * s) | 10 | 5 |
| YP (Pa) | 31 | 30.5 |
| pH | 10.7 | 9.8 |

Calcium sulfate acts as a good anionic suppressant of the reaction between coals (lignite) and bentonite—MMH/MMO complexes. The resulting fluid retains the main characteristics—high low end rheology and shear thinning behavior.

Example V

TABLE 25

Composition of Sample #5

| Products | Sample #5 |
|---|---|
| Untreated bentonite | 30 kg/m3 |
| MMH | 3 kg/m3 |
| Caustic | 0.5 kg/m3 |

Federal Supreme™ is used as the bentonite. The MMH is Polyvis II™.

The bentonite was prehydrated for three hours before the MMH was added. Caustic soda was added to adjust the pH.

To again investigate the effect of adding calcium sulfate to a mixed metal viscosified fluid, gypsum (Gyp) and lignite was added to sample #5.

TABLE 26

Results using calcium sulfate in bentonite - MMH solution

| Mud Property | Sample #5 | Sample #5 + 20 kg/m3 Gyp | Sample #5 + 40 kg/m3 Gyp | Sample #5 + 40 kg/m3 Gyp + 5 kg/m3 Lignite |
|---|---|---|---|---|
| 600 RPM | 71 | 56 | 54 | 47 |
| 300 RPM | 60 | 48 | 46 | 40 |
| 6 RPM | 27 | 24 | 22 | 20 |
| PV (mPa * s) | 11 | 8 | 8 | 7 |
| YP (Pa) | 24.5 | 20 | 19 | 16.5 |

Example VI

The experiment of Example V is repeated, adding commercial drilling fluid starch (M-I's Unitrol™) for fluid loss control to base bentonite—MMH solution (Sample #5). Then add gypsum and thereafter lignite.

TABLE 27

Results using calcium sulfate and starch in bentonite - MMH solution

| Mud Property | Sample #5 | Sample #5 + 6 kg/m3 Unitrol | Sample #5 + 6 kg/m3 Unitrol + 40 kg/m3 Gyp | Sample #5 + 6 kg/m3 Unitrol + 40 kg/m3 Gyp + 5 kg/m3 Lignite |
|---|---|---|---|---|
| 600 RPM | 67 | 57 | 61 | 59 |
| 300 RPM | 51 | 42 | 47 | 43 |
| 6 RPM | 13 | 13 | 17 | 16 |
| PV (mPa * s) | 16 | 15 | 14 | 16 |
| YP (Pa) | 17.5 | 13.5 | 16.5 | 13.5 |

The addition of lignite did not significantly reduce the viscosity of the drilling fluid.

Example VII

In the following examples, drilling fluids were prepared according to the composition of Sample #6, with any noted additives. The bentonite (Federal Supreme) is hydrated, the mixed metal moiety (Polyvis II) added and the pH adjusted with caustic soda. Thereafter, any other additives were added.

To simulate coal contamination, lignite was added.

The rheological properties have been tested using a Fann 35 and Brookfield viscometers.

TABLE 28

Composition of Sample #6

| Products | Sample #6 |
|---|---|
| Untreated Bentonite | 30 kg/m3 |
| MMH | 3 kg/m3 |
| Caustic | 0.5 kg/m3 |

TABLE 29

Results using calcium sulfate and/or potassium sulfate in bentonite - MMH solution (gel prehydrated 16 hours)

| Mud Property | Sample #6 | Sample #6 + 20 kg/m3 Gyp | Sample #6 + 40 kg/m3 Gyp | Sample #6 + 40 kg/m3 Gyp + 5 kg/m3 Lignite |
|---|---|---|---|---|
| 600 RPM | 71 | 56 | 54 | 47 |
| 300 RPM | 60 | 48 | 46 | 40 |
| 200 RPM | 56 | 46 | 44 | 38 |
| 100 RPM | 50 | 40 | 38 | 33 |
| 6 RPM | 27 | 24 | 22 | 20 |
| 3 RPM | 16 | 13 | 13 | 12 |
| PV (mPa * s) | 11 | 8 | 8 | 7 |
| YP (Pa) | 24.5 | 20 | 19 | 16.5 |

| Mud Property | Sample #6 + 50 kg/m3 K2SO4 | Sample #6 + 50 kg/m3 K2SO4 + 20 kg/m3 Gyp | Sample #6 + 50 kg/m3 K2SO4 + 40 kg/m3 Gyp | Sample #6 + 50 kg/m3 K2SO4 + 40 kg/m3 Gyp + 5 kg/m3 Lignite |
|---|---|---|---|---|
| 600 RPM | 91 | 61 | 46 | 44 |
| 300 RPM | 76 | 53 | 43 | 37 |
| 200 RPM | 67 | 51 | 41 | 34 |
| 100 RPM | 56 | 46 | 39 | 30 |
| 6 RPM | 21 | 27 | 23 | 20 |
| 3 RPM | 13 | 20 | 21 | 18 |
| PV (mPa * s) | 15 | 8 | 3 | 7 |
| YP (Pa) | 30.5 | 22.5 | 20 | 15 |

TABLE 30

Results using calcium sulfate, starch, calcium carbonate and/or other additives in bentonite (gel prehydrated 1 hour)

| Mud Property | Sample #6 | Sample #6 + 6 kg/m3 Unitrol | Sample #6 + 6 kg/m3 Unitrol 20 kg/m3 Gyp |
|---|---|---|---|
| 600 RPM | 90 | 86 | 55 |
| 300 RPM | 80 | 70 | 41 |
| 200 RPM | 74 | 62 | 34 |
| 100 RPM | 66 | 49 | 26 |
| 6 RPM | 23 | 29 | 13 |
| 3 RPM | 17 | 28 | 12 |
| PV (mPa * s) | 10 | 16 | 14 |
| YP (Pa) | 35 | 27 | 13.5 |
| Fluid Loss (mL/30 min.) | 50 | 10.5 | 18.0 |

| Mud Property | 120 kg/m3 Natural Gel | Sample #6 + 6 kg/m3 Unitrol + 90 kg/m3 Cal Carb 325 | Sample #6 + 6 kg/m3 Unitrol 20 kg/m3 Gyp + 90 kg/m3 Cal Carb 325 |
|---|---|---|---|
| 600 RPM | 271 | 58 | 52 |
| 300 RPM | 190 | 54 | 38 |
| 200 RPM | 125 | 49 | 31 |
| 100 RPM | 110 | 38 | 24 |
| 6 RPM | 39 | 19 | 11 |
| 3 RPM | 36 | 11 | 10 |
| PV (mPa * s) | 81 | 4 | 14 |
| YP (Pa) | 54.5 | 25 | 12 |
| Fluid Loss (mL/30 min.) | 54 | 14.0 | 16.0 |

| Mud Property | Sample #6 + 6 kg/m3 Unitrol + 20 kg/m3 Gyp + 3% KlaStop | Sample #6 + 6 kg/m3 Unitrol + 20 kg/m3 Gyp + 1.5% Shure Shale | Sample #6 + 6 kg/m3 Unitrol + 20 kg/m3 Gyp + 2% Inhibidrill |
|---|---|---|---|
| 600 RPM | 40 | 41 | 20 |
| 300 RPM | 33 | 30 | 13 |
| 200 RPM | 31 | 25 | 11 |
| 100 RPM | 29 | 21 | 9 |
| 6 RPM | 16 | 5 | 3 |
| 3 RPM | 14 | 4 | 2 |
| PV (mPa * s) | 7 | 11 | 7 |
| YP (Pa) | 13 | 9.5 | 3 |
| Fluid Loss (mL/30 min.) | 50 | 32 | 54 |

| Mud Property | Sample #6 | Sample #6 + 40 kg/m3 Gyp | Sample #6 + 40 kg/m3 Gyp + 0.5 kg/m3 Caustic |
|---|---|---|---|
| 600 RPM | 27 | 16 | 45 |
| 300 RPM | 19 | 12 | 39 |
| 200 RPM | 17 | 8 | 36 |
| 100 RPM | 16 | 6 | 31 |
| 6 RPM | 10 | 3 | 20 |
| 3 RPM | 9 | 2 | 14 |
| PV (mPa * s) | 8 | 4 | 6 |
| YP (Pa) | 5.5 | 4 | 16.5 |
| pH | 10.2 | 9.6 | 11.1 |

TABLE 30-continued

Results using calcium sulfate, starch, calcium carbonate and/or other additives in bentonite (gel prehydrated 1 hour)

| Mud Property | Sample #6 + 1 kg/m3 Caustic Soda | Sample #6 + 20 kg/m3 Gyp | Sample #6 + 40 kg/m3 Gyp |
|---|---|---|---|
| 600 RPM | 92 | 91 | 84 |
| 300 RPM | 81 | 81 | 75 |
| 200 RPM | 77 | 77 | 71 |
| 100 RPM | 70 | 69 | 64 |
| 6 RPM | 46 | 30 | 28 |
| 3 RPM | 43 | 21 | 21 |
| PV (mPa * s) | 11 | 10 | 9 |
| YP (Pa) | 35 | 35.5 | 33 |
| pH | 11.5 | 11.3 | 11.3 |

As is known, care may be taken in the use of some additives. As some additives such as amines, for example amine shale inhibitors, appear to destroy the bentonite complexes with or without the presence of calcium sulfate.

Example VIII

In the following examples, drilling fluids were prepared according to the composition of Sample #7 and some noted additives. The bentonite (Federal Supreme) is hydrated for three hours, the mixed metal moiety (Polyvis II) added and the pH adjusted with caustic soda. Thereafter, any additives were added.

To simulate coal contamination, lignite was added.

TABLE 31

Composition of Sample #7

| Products | Sample #7 |
|---|---|
| Untreated Bentonite | 30 kg/m3 |
| MMH | 3 kg/m3 |

TABLE 32

Results using calcium sulfate in bentonite - MMH solution

| Mud Property | Sample #7 | Sample #7 + 0.01 kg/m3 Caustic | Sample #7 + 0.04 kg/m3 Caustic |
|---|---|---|---|
| 600 RPM | 91 | 100 | 124 |
| 300 RPM | 80 | 88 | 107 |
| 200 RPM | 74 | 83 | 98 |
| 100 RPM | 66 | 76 | 86 |
| 6 RPM | 42 | 25 | 28 |
| 3 RPM | 22 | 18 | 20 |
| PV (mPa * s) | 11 | 12 | 17 |
| YP (Pa) | 34.5 | 38 | 45 |
| pH | 9.2 | 10.3 | 10.8 |

| Mud Property | Sample #7 + 20 kg/m3 Gyp | Sample #7 + 0.01 kg/m3 Caustic + 20 kg/m3 Gyp | Sample #7 + 0.04 kg/m3 Caustic + 20 kg/m3 Gyp |
|---|---|---|---|
| 600 RPM | 61 | 73 | 106 |
| 300 RPM | 53 | 63 | 96 |
| 200 RPM | 48 | 59 | 88 |
| 100 RPM | 41 | 53 | 78 |
| 6 RPM | 23 | 16 | 26 |
| 3 RPM | 11 | 13 | 21 |
| PV (mPa * s) | 8 | 10 | 10 |
| YP (Pa) | 22.5 | 26.5 | 43 |
| pH | 8.8 | 10.2 | 10.8 |

| Mud Property | Sample #7 + Caustic | Sample #7 + 2 kg/m3 Gyp | Sample #7 + 2 kg/m3 Gyp + 5 kg/m3 Lignite |
|---|---|---|---|
| 600 RPM | 95 | 98 | 93 |
| 300 RPM | 80 | 91 | 85 |
| 200 RPM | 76 | 89 | 78 |
| 100 RPM | 69 | 81 | 74 |
| 6 RPM | 22 | 24 | 25 |
| 3 RPM | 17 | 18 | 18 |
| PV (mPa * s) | 15 | 7 | 8 |
| YP (Pa) | 32.5 | 42 | 38.5 |
| pH | 10.7 | 10.7 | 10.0 |

| Mud Property | Sample #7 + Caustic + 5 kg/m3 Gyp | Sample #7 + Caustic + 5 kg/m3 Gyp + 5 kg/m3 Lignite |
|---|---|---|
| 600 RPM | 82 | 71 |
| 300 RPM | 72 | 66 |
| 200 RPM | 68 | 60 |
| 100 RPM | 60 | 53 |
| 6 RPM | 17 | 17 |
| 3 RPM | 14 | 12 |
| PV (mPa * s) | 10 | 5 |
| YP (Pa) | 31 | 30.5 |
| pH | 10.7 | 9.8 |

Gypsum slightly reduces the rheology of a bentonite-MMH fluid. The higher the initial pH, the lower the viscosity drop after addition of gypsum. Adding caustic soda to raise the pH above 11 restores fluid rheology. Gypsum appears to act as a good anionic suppressant. When additional shale inhibitors are added, the viscosity drops. The fluid retains the main characteristics—high low end rheology and shear thinning behavior.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

I claim:

1. A method for producing a mixed metal-viscosified drilling fluid comprising an aqueous mixture of bentonite, a mixed metal viscosifier, and calcium sulfate (w/v), the method comprising:

mixing water, the bentonite and the mixed metal viscosifier;
monitoring rheology of the mixed metal-viscosified drilling fluid; and,
adding the calcium sulfate in an amount of at least 0.05% (w/v) to the mixed metal-viscosified drilling fluid to avoid adverse rheological changes, wherein the calcium sulfate is added to protect an electrostatic interaction between the bentonite and the mixed metal-viscosifier, thereby maintaining the viscosity of the drilling fluid at a yield point of greater than 10 Pa.

2. The method of claim 1 wherein mixing includes 15 to 50 kg/m3 bentonite, the mixed metal viscosifier at a weight ratio of 1:8 to 1:12 viscosifier to bentonite and a base to maintain a pH above about 10.0.

3. The method of claim 2 wherein mixing includes about 25 to 45 kg/m3 bentonite and the mixed metal viscosifier in a quantity of about 1:10 of mixed metal viscosifier to bentonite with a pH controlled to greater than pH 11.

4. The method of claim 1 wherein adding includes adding 0.05 to 1.0% calcium sulfate.

5. The method of claim 1 wherein mixing includes:
mixing bentonite in water to form a bentonite mixture;
adding a mixed metal viscosifier to the bentonite mixture; and
adjusting pH to greater than about pH 10.

6. The method of claim 5 further comprising adding any of fluid loss control additives and/or lost circulation materials.

7. The method of claim 1 wherein adverse rheological changes includes viscosity thinning.

8. The method of claim 1 wherein adding is conducted prior to drilling into a coal seam.

9. The method of claim 1 wherein adding is conducted prior to initiating the drilling process.

10. The method of claim 1 wherein the calcium sulfate is in the form of gypsum.

11. The method of claim 1 wherein the mixed metal viscosifier is an inorganic particle based on magnesium/aluminum oxides and/or hydroxides.

12. The method of claim 1 wherein the mixed metal viscosifier is a mixed metal layered hydroxide compound of the following formula:

$$Li_m D_d T(OH)_{(m+2d+3+na)} A_a^n,$$

where
m represents the number of Li ions present (preferably 0);
D represents divalent metal ions such as Mg, Ca, Ba, Sr, Mn, Fe, Co, Ni, Cu, Zn, most preferably Mg, or mixtures thereof;
d is the number of ions of D in the formula, preferably from 0 to about 4, and most preferably about 1;
T represents trivalent metal ions and may be Al, Ga, Cr or Fe, preferably Al;
A represents monovalent or polyvalent anions other than OH ions and may be inorganic ions such as: halide, sulfate, nitrate, phosphate, carbonate, most preferably halide, sulfate, phosphate, or carbonate, or they may be hydrophilic organic ions such as glycolate, lignosulfate, polycarboxylate, or polyacrylates;
a is the number of ions of A in the formula;
n is the valence of A; and
(m+2d+3+na) is equal to or greater than 3.

* * * * *